US009707880B2

United States Patent
Ochenkowski

(10) Patent No.: US 9,707,880 B2
(45) Date of Patent: Jul. 18, 2017

(54) MOTORCYCLE LIFT

(71) Applicant: Kenneth Ochenkowski, Northford, CT (US)

(72) Inventor: Kenneth Ochenkowski, Northford, CT (US)

( * ) Notice: Subject to any disclaimer, the term of this patent is extended or adjusted under 35 U.S.C. 154(b) by 0 days.

(21) Appl. No.: 14/960,686

(22) Filed: Dec. 7, 2015

(65) Prior Publication Data

US 2016/0159264 A1 Jun. 9, 2016

Related U.S. Application Data

(60) Provisional application No. 62/089,321, filed on Dec. 9, 2014.

(51) Int. Cl.
*B60P 1/44* (2006.01)
*B60P 3/07* (2006.01)
*B60P 3/12* (2006.01)

(52) U.S. Cl.
CPC ........... *B60P 1/4442* (2013.01); *B60P 1/4492* (2013.01); *B60P 3/07* (2013.01); *B60P 3/122* (2013.01)

(58) Field of Classification Search
CPC ..... B60P 1/4414; B60P 1/4435; B60P 1/4442; B60P 1/4492; B60P 1/44; B60P 1/4428; B60P 1/4471
See application file for complete search history.

(56) References Cited

U.S. PATENT DOCUMENTS

| 3,837,513 A | * | 9/1974 | Adamek | B60P 1/4428 414/462 |
| 4,239,440 A |   | 12/1980 | James | |
| 4,391,345 A | * | 7/1983 | Paul | E04G 1/22 182/141 |
| 4,447,042 A | * | 5/1984 | Masui | B66F 7/0641 187/204 |
| 4,958,979 A | * | 9/1990 | Svensson | B60P 1/4435 182/158 |
| 5,211,265 A | * | 5/1993 | Gregg | B66F 7/08 187/211 |
| 5,297,653 A | * | 3/1994 | Wurtz | B66F 11/042 182/141 |
| 5,346,355 A | * | 9/1994 | Riemer | B60P 1/4435 224/310 |

(Continued)

FOREIGN PATENT DOCUMENTS

DE 19606196 A1 * 8/1997 ............ B60P 1/4442

*Primary Examiner* — Kaitlin Joerger
(74) *Attorney, Agent, or Firm* — Bachman & LaPointe, P.C.

(57) ABSTRACT

A lift system comprising a chassis having a frame. The frame including a first extension member and a second extension member opposite thereof. Each of the first extension member and the second extension member being extendable and coupled to the frame. A first scissor support is coupled to the first extension member. A second scissor support is coupled to the second extension member. The first and second scissor supports are configured rigid and extendable from each of the first and second extension members. A platform is coupled to each of the first and second scissor support. The platform is configured to rigidly support an object coupled thereto. An actuator is coupled to the scissor lift. The actuator is configured to move the platform.

16 Claims, 13 Drawing Sheets

(56) References Cited

U.S. PATENT DOCUMENTS

| | | | | |
|---|---|---|---|---|
| 5,460,460 A * | 10/1995 | Alexander | B65G 69/2823 | 14/71.3 |
| 5,636,711 A * | 6/1997 | Nussbaum | B66F 7/0666 | 182/141 |
| 6,019,567 A | 2/2000 | Lutkus et al. | | |
| 6,059,527 A | 5/2000 | Ranken et al. | | |
| 6,092,787 A * | 7/2000 | Nayman | B25H 1/0014 | 254/10 R |
| 6,345,693 B1 * | 2/2002 | Yeo | B25H 1/0014 | 187/211 |
| 6,435,804 B1 * | 8/2002 | Hutchins | B60P 1/4414 | 187/200 |
| 6,666,643 B1 | 12/2003 | Heynssens | | |
| 6,814,188 B1 * | 11/2004 | Heckert | B66F 7/065 | 187/211 |
| 6,893,203 B2 * | 5/2005 | Anderson | B60P 1/4414 | 414/467 |
| 7,066,448 B2 * | 6/2006 | Thurm | B62H 3/10 | 254/124 |
| 7,648,324 B1 | 1/2010 | Jensen | | |
| 7,748,943 B2 | 7/2010 | Studer | | |
| 8,151,935 B2 * | 4/2012 | Graham | B66F 7/0625 | 182/62.5 |
| 9,381,867 B2 * | 7/2016 | Robinson | B60R 9/06 | |
| 2006/0051191 A1 * | 3/2006 | Dupuy | B60P 1/4457 | 414/522 |
| 2007/0017748 A1 * | 1/2007 | Heckert | B66F 7/065 | 187/211 |
| 2007/0235266 A1 * | 10/2007 | Dantas | B66B 9/04 | 187/269 |
| 2013/0193392 A1 * | 8/2013 | McGinn | B66F 7/243 | 254/93 R |
| 2015/0003944 A1 * | 1/2015 | Eidsmore | B60P 1/6409 | 414/499 |
| 2015/0314734 A1 * | 11/2015 | Robinson | B60R 9/06 | 414/462 |
| 2016/0031354 A1 * | 2/2016 | Miles | B60P 1/4414 | 211/1.51 |
| 2016/0060084 A1 * | 3/2016 | Baudermann | B66F 7/0625 | 414/347 |
| 2016/0200558 A1 * | 7/2016 | Nedelman | B65G 67/24 | 414/497 |

* cited by examiner

MOTORCYCLE LIFT

BACKGROUND

This application claims the benefit of U.S. Provisional Application No. 62/089,321 that was filed Dec. 9, 2014 by Kenneth Ochenkowski, which was entitled "Motorcycle Lift," and which is also incorporated herein by reference.

The present disclosure is directed to a device for lifting heavy objects into the bed of a truck. Specifically, the disclosure describes a motorcycle lift configured to deploy from the bed of a pick-up truck.

The need exists for a stable, easy-to-use lifting system to facilitate the lifting and moving of heavy objects, such as a motorcycle, by a single individual, and which may be installed in a vehicle.

Trucks have been equipped with lifting tail gates, which essentially serve as a vertical elevator that is raised or lowered in the course of moving an object between the cargo space of the truck and ground level. Such elevator devices typically employ hydraulic cylinders for supporting the load carrying assembly for vertical movement. The elevator lift is best incorporated into the truck during manufacture. The elevator lift is difficult and expensive to add as an aftermarket accessory, if the existing vehicle was not originally equipped with the elevator lift.

Trucks with open beds have been equipped with crane-like hoists with a rotatable base and a boom that is pivotally mounted on the base for swinging movement. A winch located on the base or an adjacent part of the boom includes a cable or belt that extends along the boom and passes over a pulley at the end of the boom. This style of crane-like equipment usually encroaches on the cargo space. It must be relatively heavy and tends to be expensive. The boom is typically relatively long in order to effectively handle loading and unloading objects. The crane apparatus is not adapted for use with vehicles such as vans having closed tops over cargo spaces provided with relatively restricted clearance for loads at one end. The cable or belt on this apparatus is free to swing and sway once the load is lifted from the ground. A load that is unrestrained from freely swinging or swaying can be dangerous.

The previously designed lift systems have included flexible, non-rigid cable or belt lifting elements that allows for the object being loaded to sway and otherwise move relative to the lift structure. The non-rigid characteristics of these systems creates the potential for the object being lifted to shift and otherwise tip and even topple over. This design weakness can be more evident on hills and other non-level terrain. The free swinging lift systems are not capable of preventing the sway of the object on the lift base once the lift base has been lifted from the ground.

Therefore, it is desirable to provide a mechanism which is attached to the vehicle to load and unload objects from the cargo bed. It is desirable for the lift mechanism to remain rigid and prevent the object being lifted from swaying or tilting. It is further desirable that the loading and unloading apparatus be easily removable from the vehicle by the user.

SUMMARY

In accordance with the present disclosure, there is provided a lift system comprising a chassis having a frame. The frame including a first extension member and a second extension member opposite thereof. Each of the first extension member and the second extension member being extendable and coupled to the frame. A first scissor support is coupled to the first extension member. A second scissor support is coupled to the second extension member. The first and second scissor supports are configured rigid and extendable from each of the first and second extension members. A platform is coupled to each of the first and second scissor support. The platform is configured to rigidly support an object coupled thereto. An actuator is coupled to the scissor lift. The actuator is configured to move the platform.

In an exemplary embodiment the chassis is insertable in a cargo area.

In an exemplary embodiment the chassis is removable from the cargo area.

In an exemplary embodiment the frame comprises at least one cross member coupling the first extension member and the second extension member.

In an exemplary embodiment the first extension member and the second extension member are configured as a nested arrangement configured toe telescopically translate relative to each other beyond a cargo area.

In an exemplary embodiment the platform is configured to support a motorcycle.

In an exemplary embodiment the lift system comprises an extender coupled to the platform at a central portion of the platform, the extender being configured to translate along the platform.

In an exemplary embodiment the extender comprises a wheel hitch configured to secure a wheel of a motorcycle.

In an exemplary embodiment the first and second scissor supports are configured hinged at a center axis, configured to raise and lower the platform.

In an exemplary embodiment the first and second scissor supports are configured rigid and configured to prevent the platform from at least one of twisting and swinging relative to the first extension member and the second extension member.

In an exemplary embodiment the actuator is configured to extend and retract the first extension member and the second extension member.

In an exemplary embodiment the first extension member and the second extension member each further comprise a bottom section formed in a C-channel cross-section coupled to the chassis; a center section nested in the bottom section; an upper section coupled to the center section opposite the bottom section and configured to cover a nested arrangement.

In an exemplary embodiment the center section comprises a I-beam shaped cross-section.

In an exemplary embodiment the upper section comprises a translational slide configured to guide the first and second scissor supports respectively.

In an exemplary embodiment at least one of the upper section, center section and bottom section comprises bearings configured to lower friction In an exemplary embodiment the first and second scissor supports are coupled to the first extension member and the second extension member respectively at a pivot point, the pivot point being fixed to the first extension member and the second extension member respectively, and at a translational slide on the first extension member and the second extension member respectively, wherein the first and second scissor supports translate and pivot in the translational slide.

In an exemplary embodiment the actuator further comprises a drive chain coupled to the actuator at a first end of the drive chain and coupled to a distal end of each of the first and second scissor supports at a second end of the drive chain.

In an exemplary embodiment the actuator is coupled to a distal end of at least one of the first and second scissor supports proximate the translational slide of each of the first extension member and the second extension member respectively.

In an exemplary embodiment the actuator is coupled to a center axis of each of the first and second scissor supports.

In an exemplary embodiment the actuator is coupled to a distal end of at least one of the first and second scissor supports opposite the translational slide of each of the first extension member and the second extension member respectively.

In an exemplary embodiment the actuator is coupled to two opposing ends of a pair of rigid supports hinged at a center axis of at least one of the first and second scissor supports Other details of the motorcycle lift are set forth in the following detailed description and the accompanying drawing wherein like reference numerals depict like elements.

DETAILED DESCRIPTION

Figure 1:
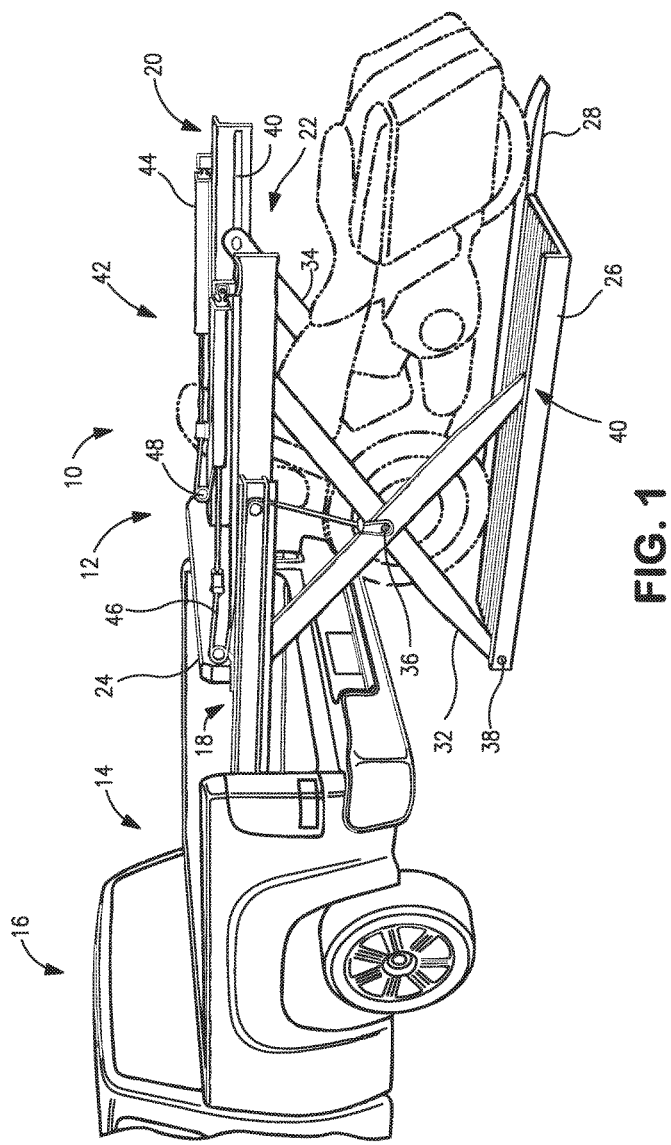
FIG. 1 is an illustration of an exemplary lift system mounted in the bed of a truck with extensions and lift platform deployed to receive a motorcycle.
Figure 2:
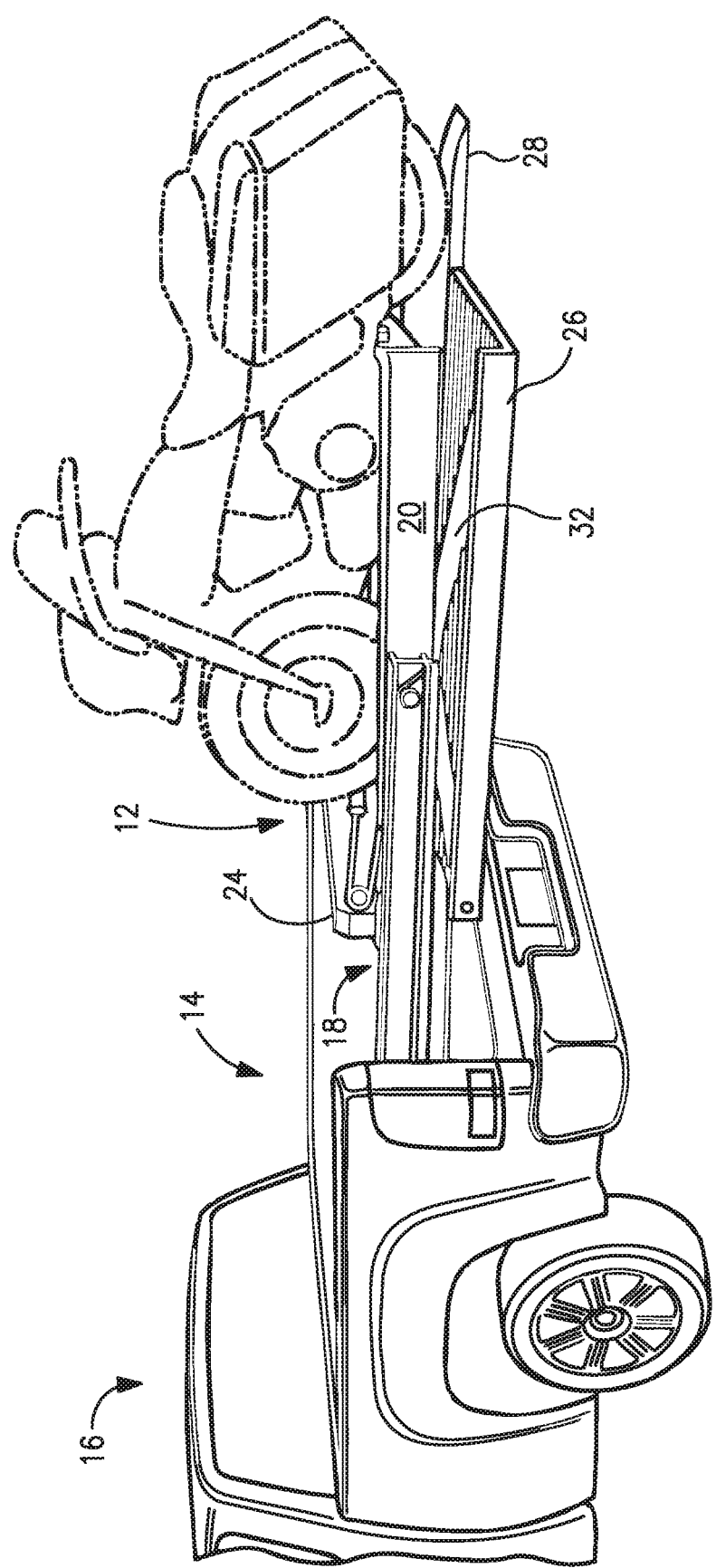
FIG. 2 is an illustration of the exemplary lift system with the lift platform elevated off the ground with a motorcycle contained on the platform.
Figure 3:
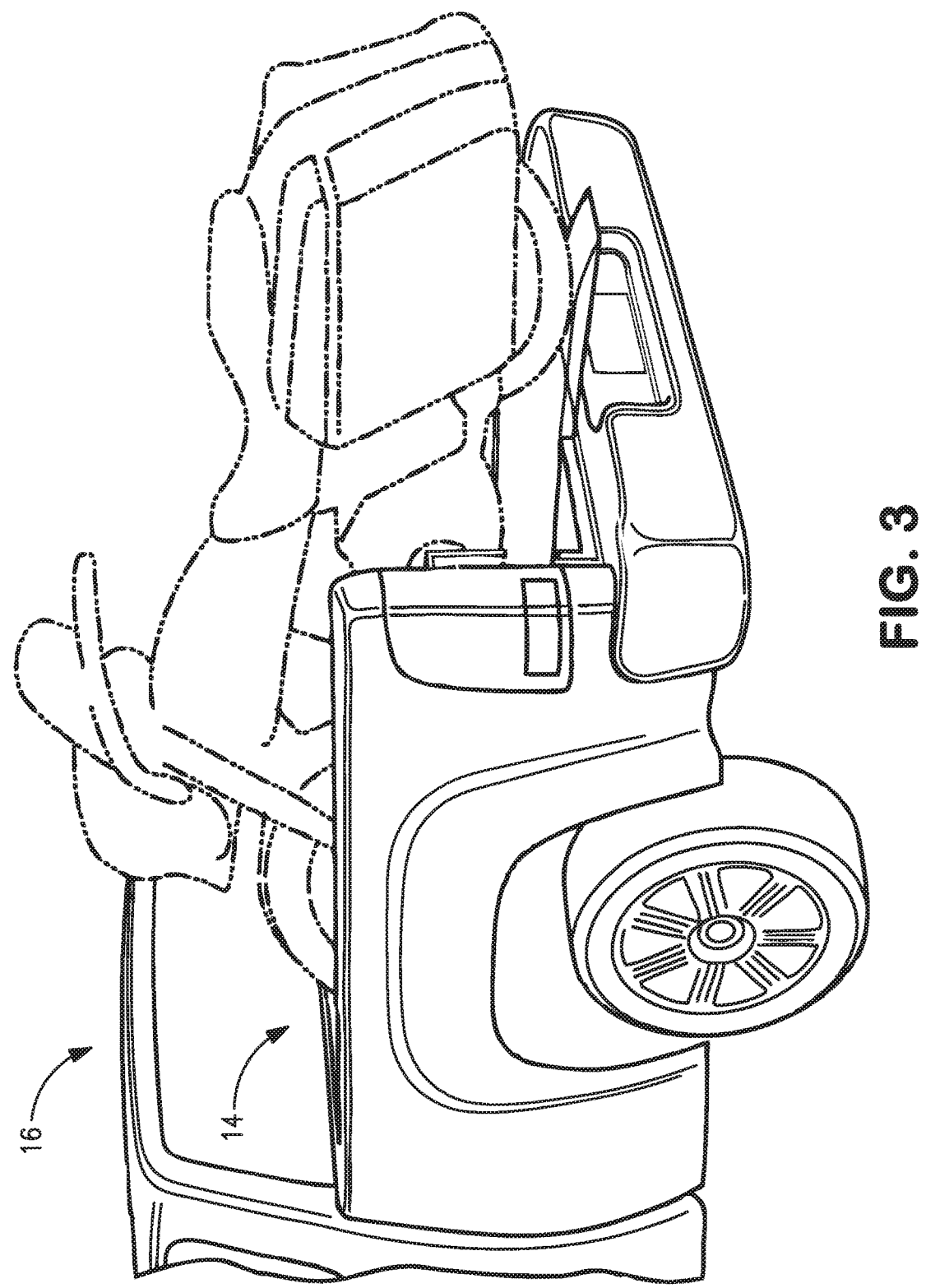
FIG. 3 is an illustration of the exemplary lift system mounted in the bed of the truck with the lift platform nested in the bed of the truck.
Figure 4:
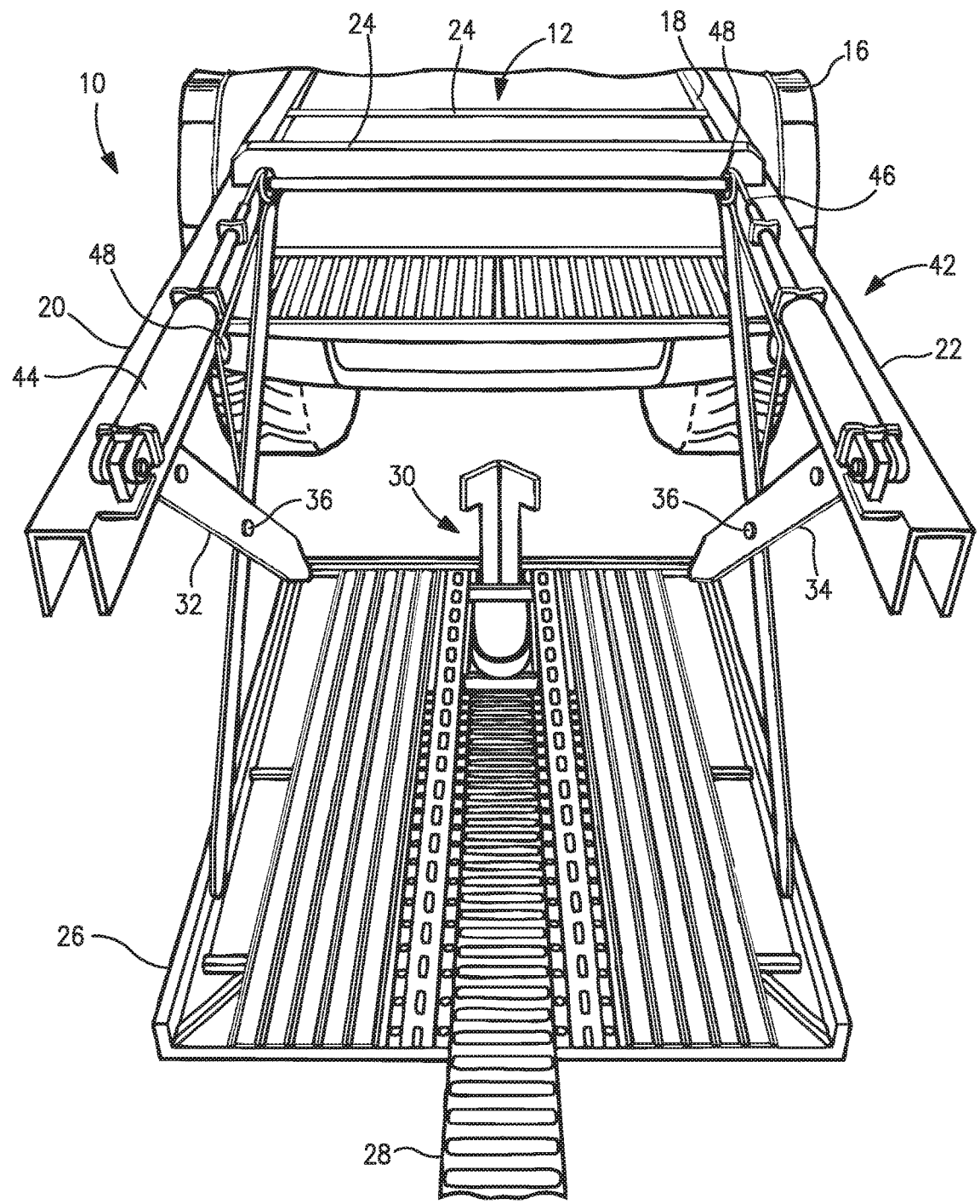
FIG. 4 is an illustration of the exemplary lift system deployed in an extended fashion with the lift platform grounded.

Referring now to FIGS. 1 through 4, there is illustrated a lift system 10 having generally a chassis, structure 12. The chassis 12 is configured to be placed into the cargo area of a vehicle, more specifically the bed 14 of a pick-up truck 16. It is contemplated that the chassis 12 can be designed to fit into the cargo space of a van or other vehicles, such as a trailer. The chassis 12 includes a frame 18 that includes support members 20 configured cooperate in a nested fashion to fit in the bed 14. The chassis 12 is removable from the bed 14.

The frame 18 includes a c-frame structure of members or beams. The c-frame structure provides superior structural integrity and allows for open space within the bed 14 to maximize the cargo capacity. A first set of extension members 20 and second set of extension members 22 are coupled opposite each other and supported by a set of cross members 24. The first and second extension members 20, 22, are set apart and span along the length of the chassis 12 with the cross members 24 connecting the extension members 20, 22 and span the width of the chassis 12. The extension members 20, 22 and cross members 24 are sized to fit in the bed 14 and can be sized appropriately to fit the vehicle cargo space.

The first and second extension members 20, 22 can be formed from various beam structures that allows for a nested arrangement so that multiple members can telescopically translate relative to each other. The extension members 20, 22 conserve space and allow for a translational extension of the chassis 12 that can change configuration from a compact or retracted state and extend into an elongated state. The extension members 20, 22 are configured to extend from the confines of the bed 14 outward to deploy into the aft of the truck 16 beyond the bed 14.

A lift platform, or simply platform 26 can be coupled between the first and second extension members 20, 22. The platform 26 is configured as a rigid box frame with plates or open webbing spanning the surface of the platform 26. The platform 26 can be structurally rigid and lightweight. The platform 26 can be configured to perform a variety of job specific tasks and adapted appropriately. Heavy objects, such as a motorcycle (shown in ghost lines) can be placed on the platform 26. The platform 26 is configured to support the object as well as secure the object to prevent unwanted movement or shifting of the object.

In another exemplary embodiment, the platform 26 can be configured as a bucket or tub or box that can contain loose material and operate as a dump. Extender 28 can be coupled to the platform 26 at a central portion of the platform 26. The extender 28 is configured to slide or translate along the platform 26 and extend the length of the platform 26. The extender 28 is shown as a relatively narrow member but can be configured in any width within the platform 26. The extender 28 can also include features for stabilization, traction and the like to improve the ground stability of the platform 26. The extender 28 can have a tapered end that allows for objects to more easily load onto the platform 26. The platform 26 can include other accessories, such as a coupling 30, like a wheel hitch for receiving and securing the front wheel of the motorcycle (shown in ghost lines at FIGS. 1-3).

The platform 26 is coupled to the first and second extension members 20, 22 with a first scissor support 32 and a second scissor support 34 respectively. The first and second scissor supports 32, 34 each comprise a pair rigid supports hinged at a center axis 36 similar to a pair of scissors. The first and second scissor supports 32, 34 are connected to the first and second extension members 20, 22 respectively by a variety of methods, such as by pivot pins 38 and translational slides 40. The scissor supports 32, 34 hinge and translate in a scissors movement. The platform 26 is raised and lowered with the use of the scissor supports 32, 34. Because of the rigid nature of the scissor supports 32, 34, the platform 26 does not sway or twist when it is raised or lowered. The scissor supports 32, 34 offer a distinct advantage over prior designs.

An actuator mechanism or simply actuator 42 is coupled to the chassis 12 and provides the motive forces to operate the lift system 10. There can be a variety of actuator designs that can operate the lift system 10. In an exemplary embodiment, the actuator 42 includes a set of hydraulic cylinders 44 coupled to drive chains 46 for each respective first and second extension member 20, 22 and scissor support 32, 34 pairs. The actuator 42 can include a linear actuator powered by electric motor drives. The actuator 42 can be a screw driven actuator. Hydraulic and pneumatic actuator designs are also contemplated. The actuator 42 provides linear drive motion that is directed through a set of pulleys 48 to the first and second scissor supports 32, 34. The actuator 42 pulls the platform 26 via the scissor supports 32, 34 to raise the platform 26. The actuator 42 releases the tension on the scissors supports 32, 34 to lower the platform 26. In exemplary embodiments, the actuator 42 can provide the motive forces to extend and retract the first and second extension members 20, 22.

Figure 5:
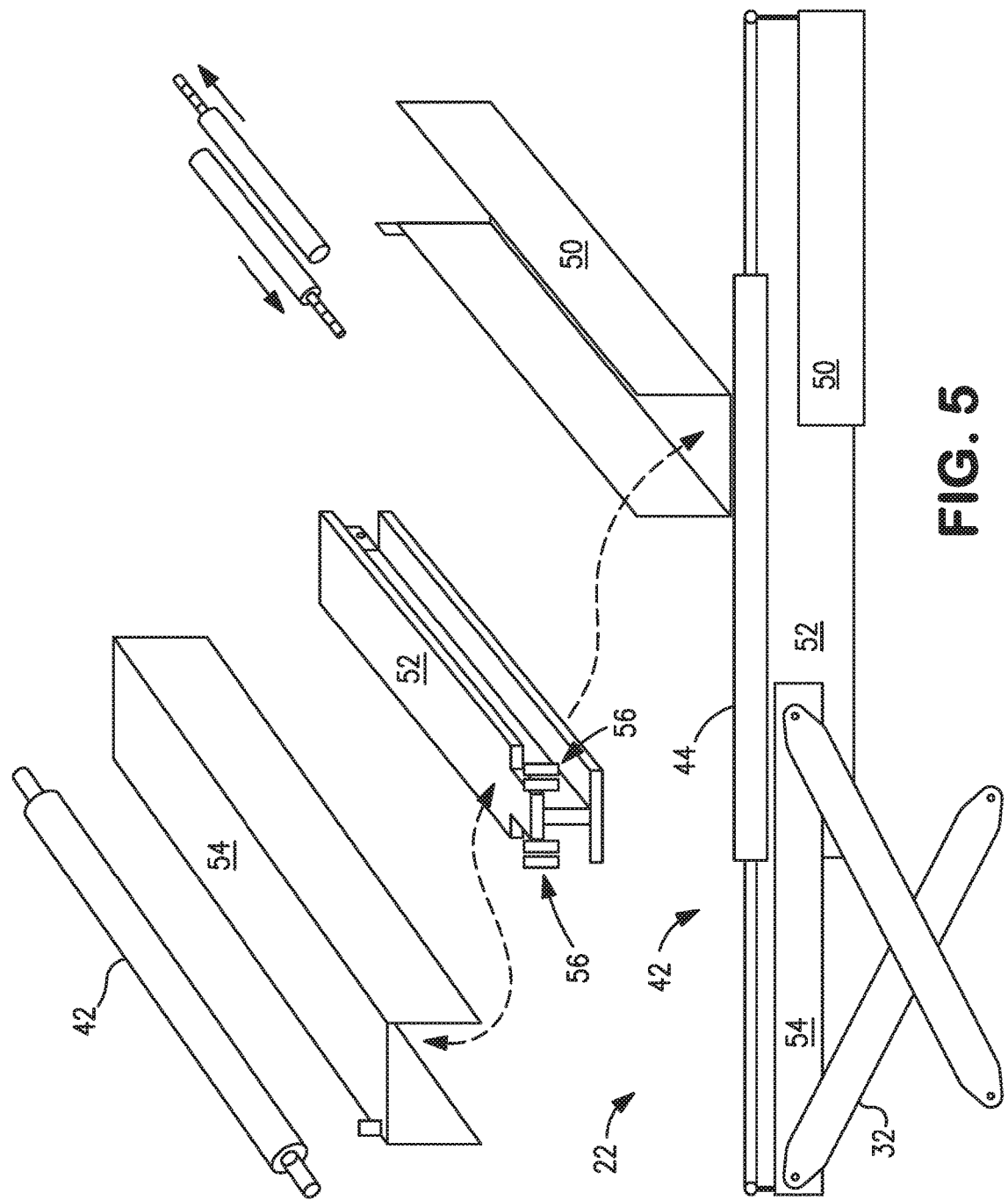
FIG. 5 is an exploded view of an exemplary extension member for the lift system.
Figure 6:
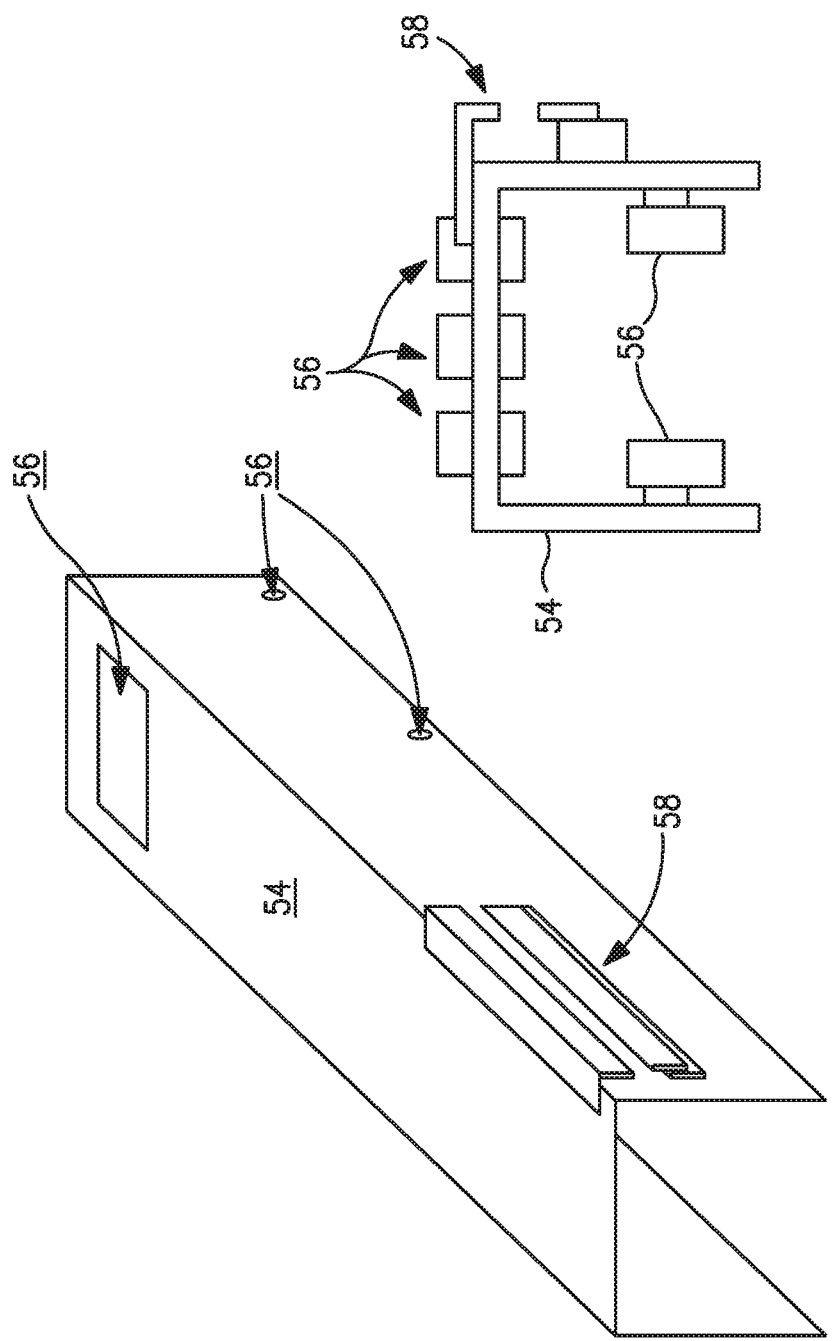
FIG. 6 is an illustration of an exemplary upper rail portion of the extension member of the lift system.
Figure 7:
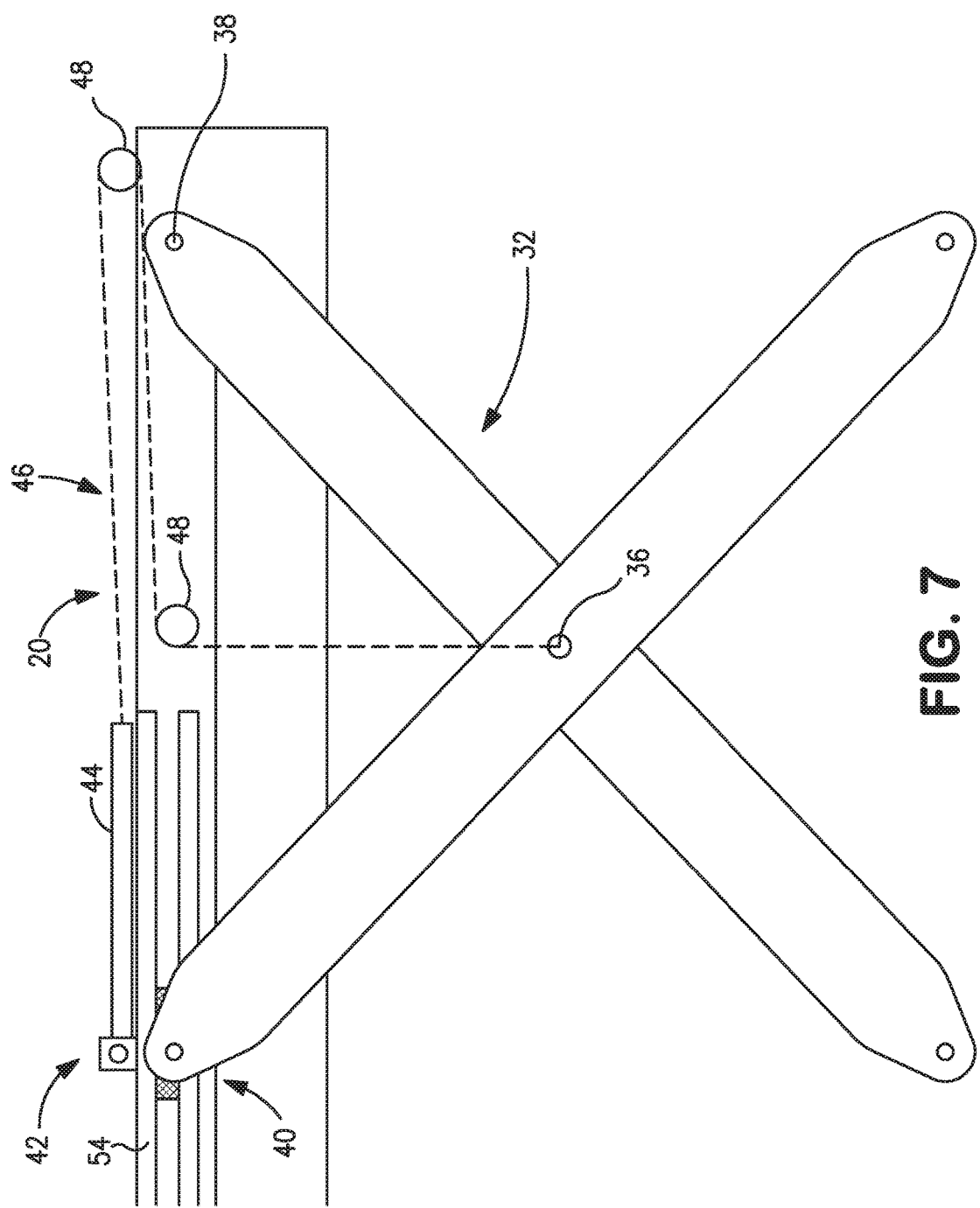
FIG. 7 is an illustration of an exemplary scissor frame member of the lift system.

Referring to FIGS. 5-6, greater detail of the exemplary extension member 20, 22. In an exemplary embodiment, the extension member 20, 22 can include multiple portions that interact to provide the support and mechanical advantage for the extension member 20, 22 to function. A bottom section or rail 50 formed in a c-channel cross-section design serves to anchor the extension members 20, 22 to the frame 18 of the chassis 12 proximate the bed 14. The bottom section 50 can also have a closed opening to contain and support additional sections. A center section or rail 52 is nested in the bottom section 50 and supported by the bottom section 50. An upper section or rail 54 is coupled to the center section 52 and serves to cap or cover the nested arrangement of the extension member 20, 22. The actuator 42 can be coupled to the upper section 54 and bottom section 50 and when extended or retracted, operates to translate the upper section 54 center section 52 relative to the bottom section 50. In an exemplary embodiment, the center section 52 can have an I-beam shaped cross section, or similar shape to facilitate bearing the load of both the upper section 54 and contact with the bottom section 50. The upper section can have a c-channel shaped cross-section that facilitates a nested configuration between the three sections 50, 52, 54 of the extension members 20, 22. The upper section 54 can include a partially closed slot or simply slots 58 to function as the translational slides 40 in cooperation with the scissor support 32, 34.

As shown in FIGS. 5 and 6 there are various bearings 56, such as roller bearings that can be arranged on the bottom section, 50, center section 52, and upper section 54 to facilitate lower friction between the sections of the extension member 20, 22 during operation.

FIGS. 7-13 show a variety of alternative embodiments for the actuator 42 and scissor support 32, 34 mechanisms. At FIG. 7 a similar embodiment as was shown above is arranged with the actuator coupled to the upper section 54 of the extension member 20, 22. The drive chain 46 is guided through a set of pulleys 48 and finally coupled to the center axis 36 of the scissor support 32, 34. The scissor support 32 is coupled to the first extension member 20 at two locations. The first location is a pivot point 38 that is fixed relative to the extension member 32. The scissor support rotates about the pivot pin 38 but does not translate relative to the extension member 20. The other location is at a translational slide 40, allowing the scissor support 32 to move relative to the extension member 20 both along the translational path and in a pivoting fashion. As the actuator 42 creates linear motion and retracts the drive chain 46, the scissor support 32 pivots about the center axis 36 and the pivot pin 38 as well as pivots and slides along the translational slide 40, so that the scissor support moves from a relatively extended position to a relatively retracted position.

Figure 8:
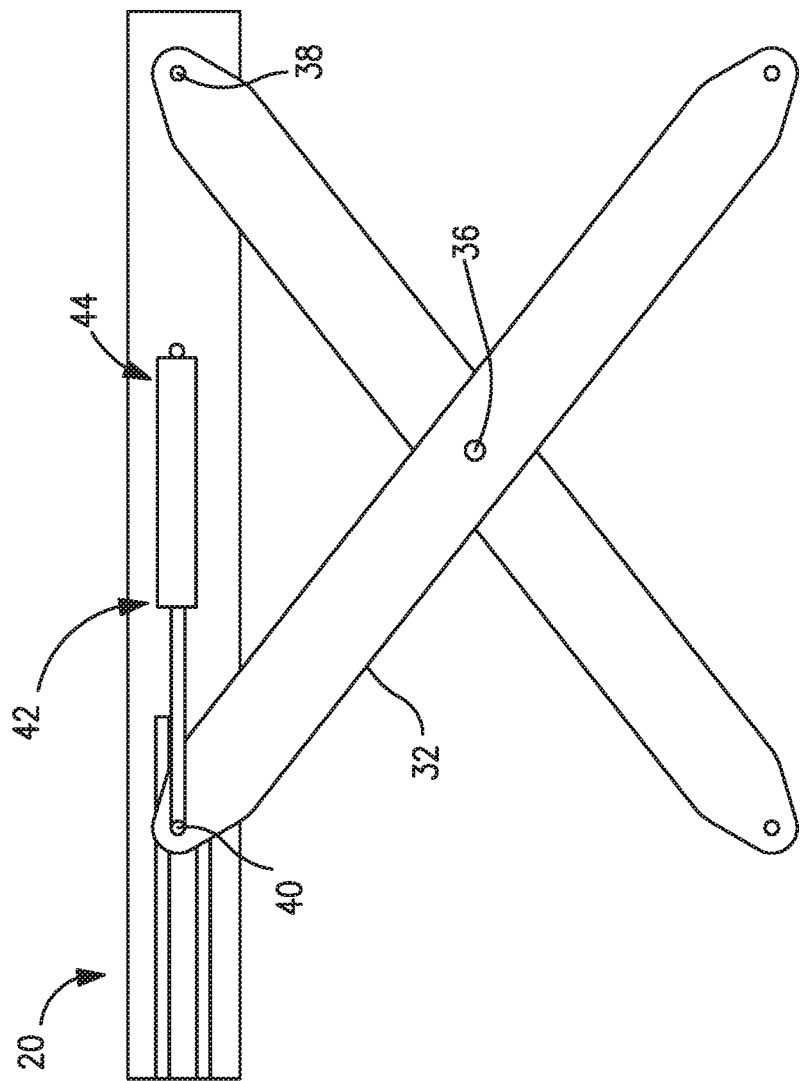
FIG. 8 is an illustration of an exemplary scissor frame portion and actuator of the lift system.

FIG. 8 shows another alternative embodiment of the actuator 42 with a hydraulic or linear actuator 44 directly coupled to the translational slide 40. Opposite the translational slide 40 is a pivot pin 38 coupling the scissor support 32 to the extension member 20.

Figure 9:
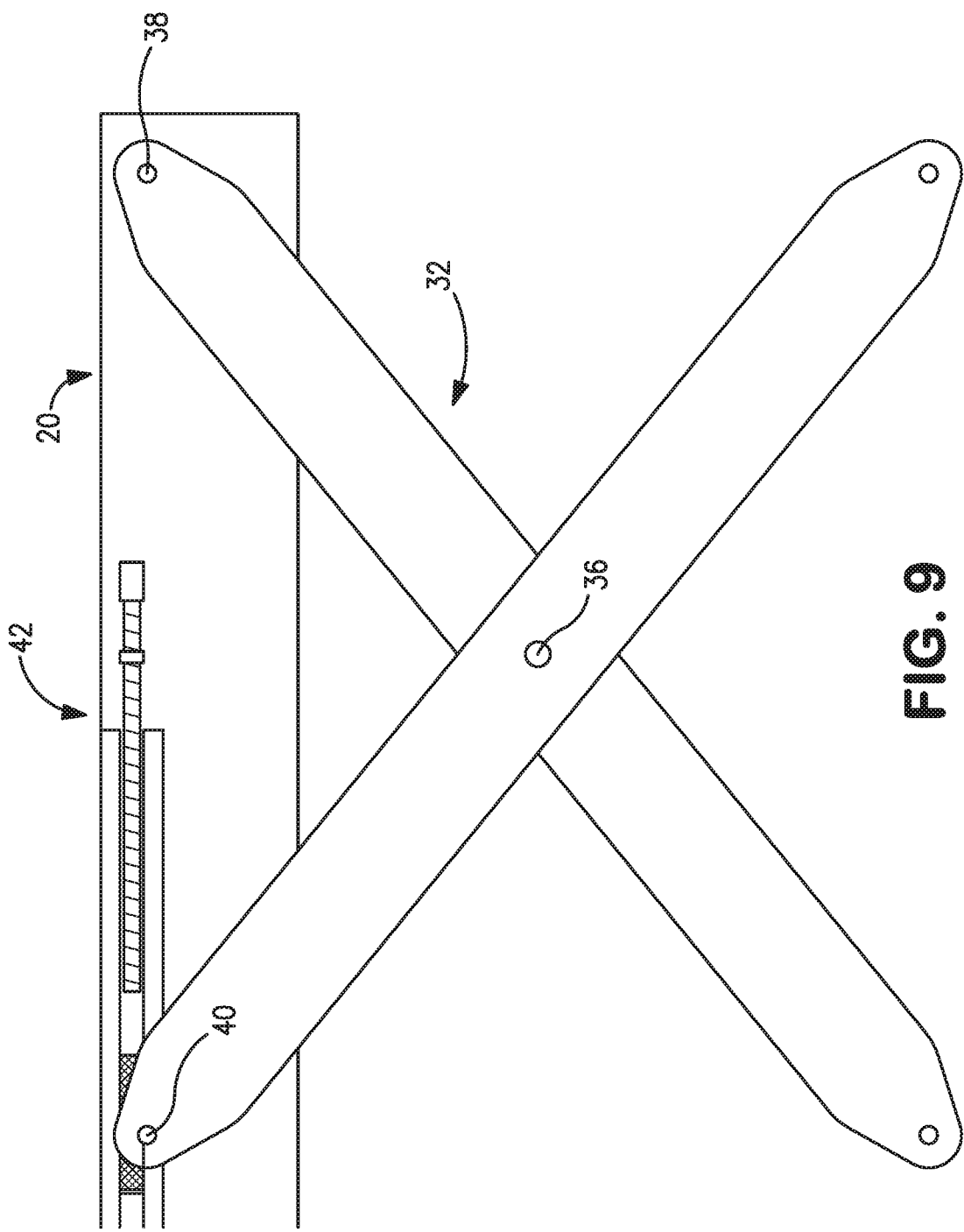
FIG. 9 is an illustration of an exemplary scissor frame portion and actuator of the lift system

FIG. 9 shows another alternative actuator 42 comprising a motor and screw drive mechanism that creates linear translation along the translational slide 40 for the scissor support 32 to operate.

Figure 10:
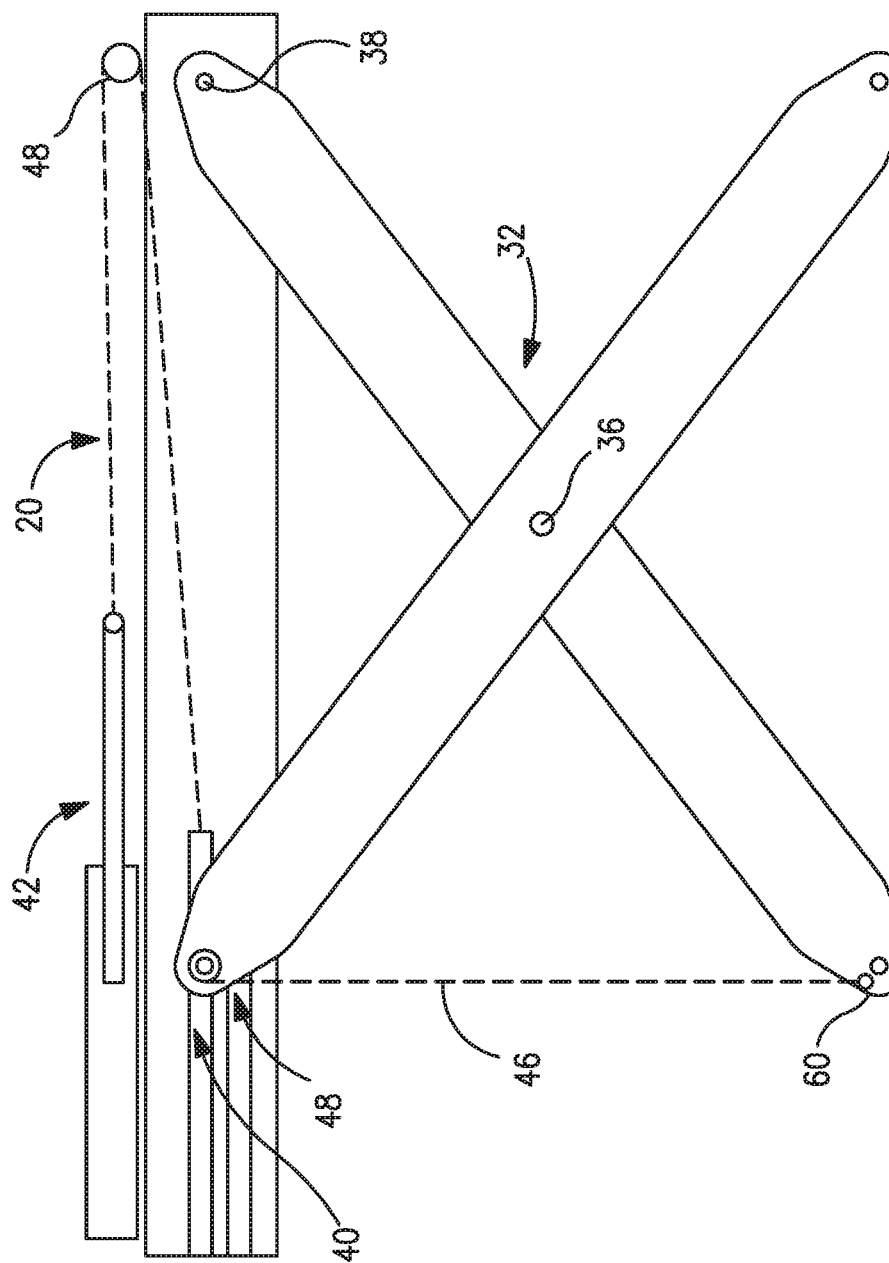
FIG. 10 is an illustration of an exemplary scissor frame portion and actuator of the lift system.

FIG. 10 shows another alternative embodiment of the actuator 42 and scissor support 32 being coupled via a drive chain 46 connected at a distal end 60 of the scissor support 32 instead of at the center axis 36. The drive chain 46 is guided over at least one pulley 48. In this embodiment, the actuator 42 translates and draws the chain 46 such that the distal end 60 of the scissor support 32 is pulled and collapses the extended scissor support 32 from an extended position to a retracted position.

Figure 11:
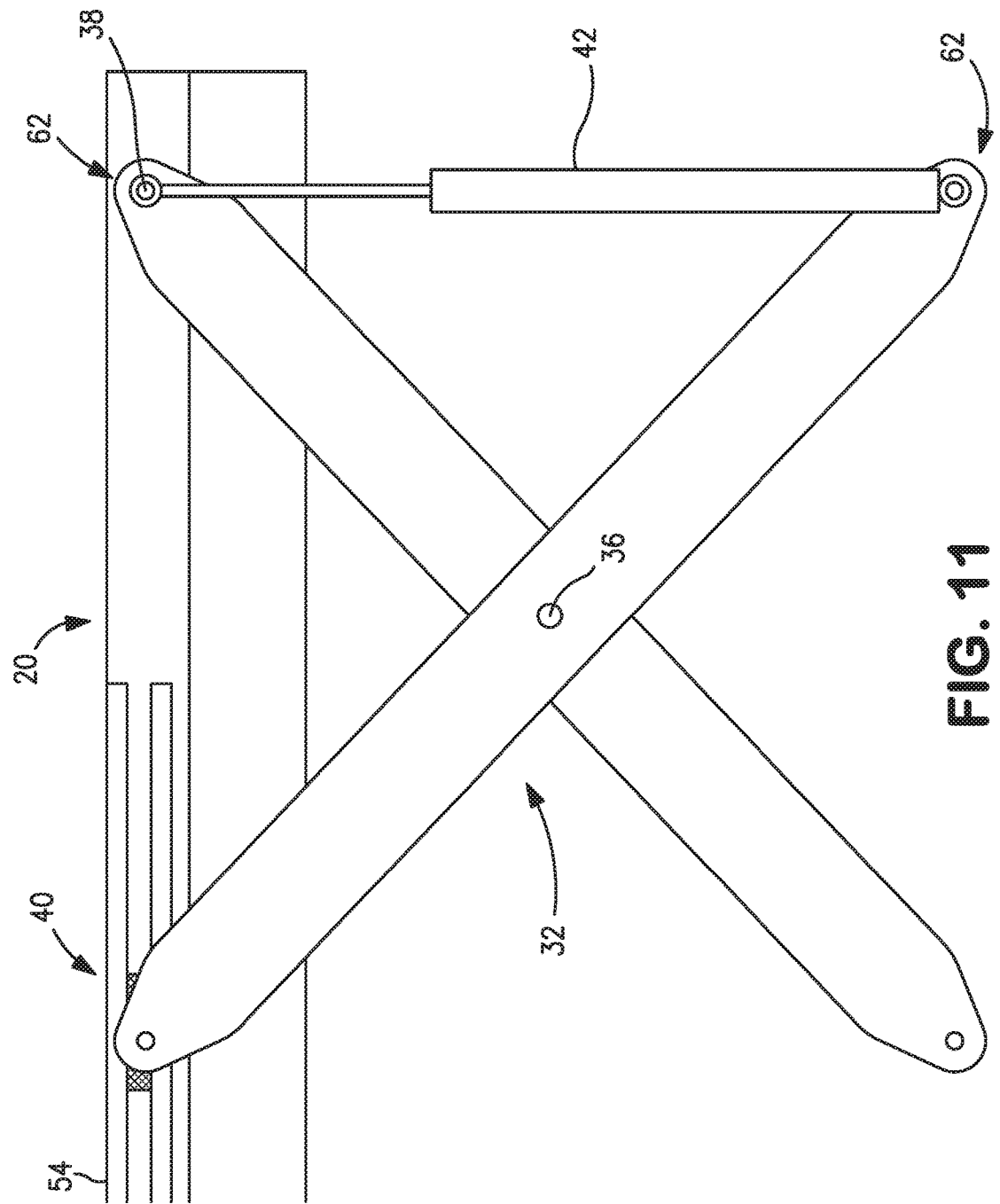
FIG. 11 is an illustration of an exemplary scissor frame portion and actuator of the lift system.

FIG. 11 shows another alternative embodiment of the actuator 42 and scissor support 32 with the actuator 42 directly coupled to the scissor support 32 at two opposing ends 62 of each of the pair rigid supports hinged at a center axis 36 of the scissor support 32. The actuator 42 acts directly on each of the pair of rigid supports and operates the scissor support 32 as described above.

Figure 12:
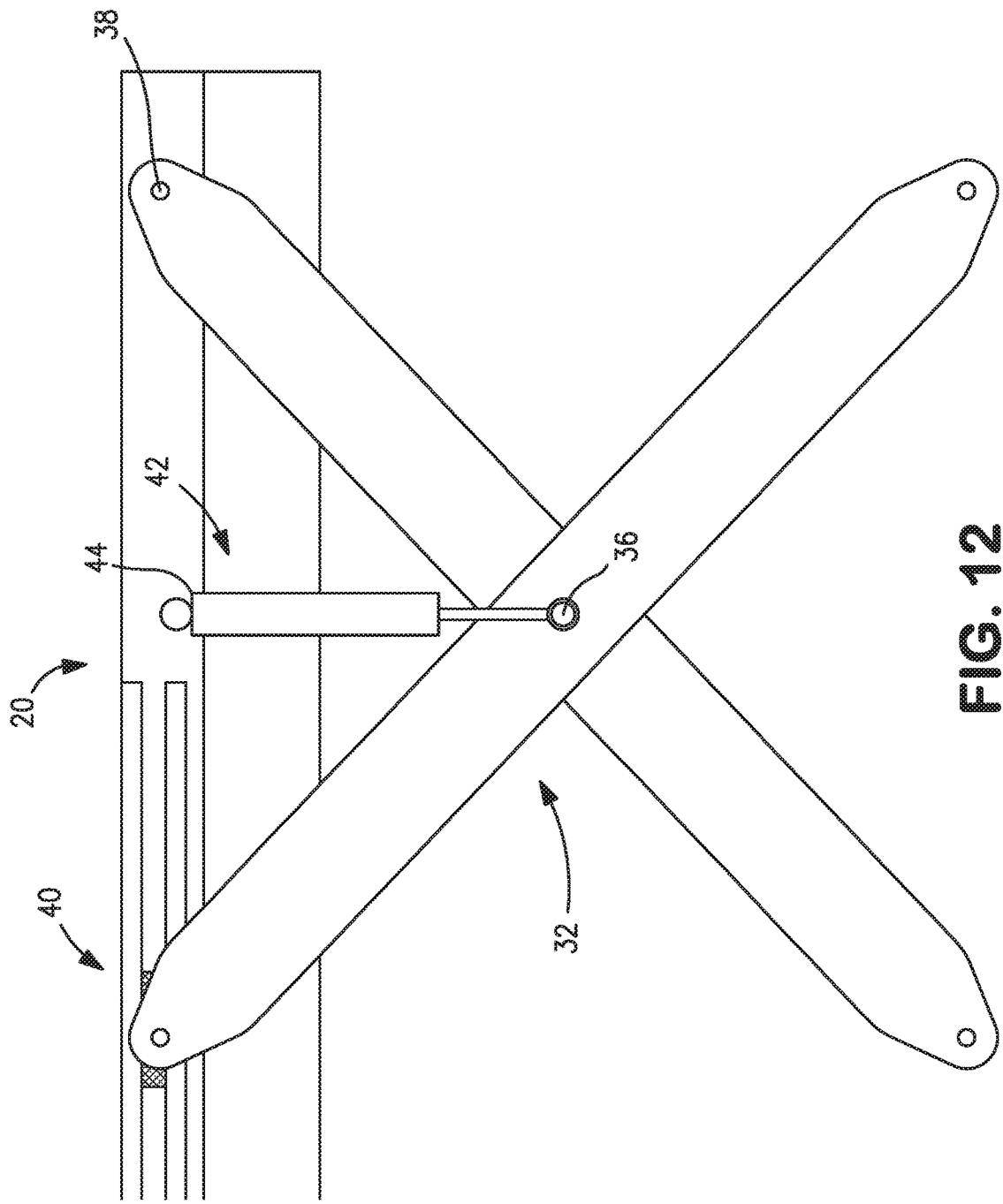
FIG. 12 is an illustration of an exemplary scissor frame portion and actuator of the lift system.

FIG. 12 shows another alternative embodiment of the actuator 42 and scissor support 32 with the actuator 42 directly coupled to the scissor support 32 at the center axis 36. The actuator 42 acts directly on the scissor support 32 or 34 at the center axis 36. The actuator 42 is coupled to extension member 20, 22 opposite the center axis 36.

Figure 13:
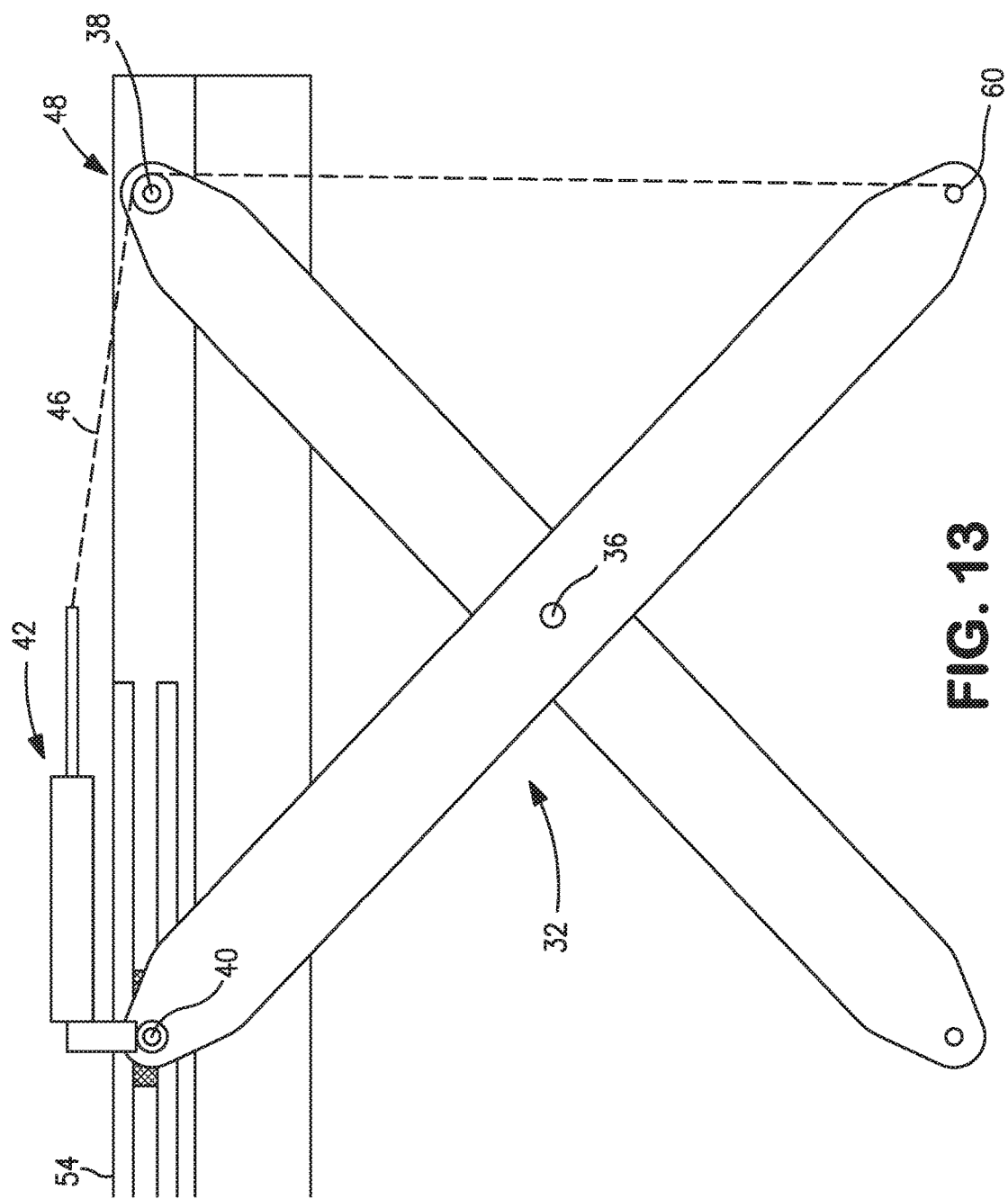
FIG. 13 is an illustration of an exemplary scissor frame portion and actuator of the lift system.

FIG. 13 shows another alternative embodiment of the actuator 42 and scissor support 32 with the actuator 42 directly coupled to the scissor support 32 at one end of one of the rigid portions of the scissor support 32. 34 which is also coupled to the translation slide 40. The actuator 42 is also coupled to a drive chain 46 through a pulley 48 at an end of another rigid portion of scissor support 32. The drive chain 46 terminates at the opposing end 60 of the rigid portion of the scissor support 32 opposite the mounted actuator 42 at the translational slide 40.

The lift system allows the user to lift a load in a stable and level fashion. By use of the lift system described herein, the user can extend the structure out of the truck bed in a cantilever maneuver and lift objects over difficult to reach/traverse locations such as, a sidewalk, or stairways. The exemplary lift system does not require additional external support legs placed at the ends of the structure to support the load on the structure. The lift system design allows the user to secure the object while at ground level. The user is not required to climb up into the truck bed to operate the exemplary lift system. The lift system is designed to store in a 6 foot 6 inch truck bed. The exemplary lift system described herein does not require the tailgate of the truck to be removed. It allows for swing clearance of any tow behind device, such as a trailer. The lift system has a low profile that does not extend above the truck bed sidewalls, thus facilitating use of a truck cap or bed cover. The lift system lifts the load only high enough to clear the truck bed floor. This low profile lift may allow one to lift inside a confined space, such as a garage. The actuator of the exemplary lift system can be hydraulic, gear drive or linear actuators. The rollers of the lift system are concealed from the elements and weather allowing for better durability. The platform includes a removable section, to provide flexibility in use. The platform of the lift system is low profile, which allows for easy loading and unloading. The lift system can include a bucket, tub, or box that can contain loose material and operate as a dump.

The nature of the apparatus provides an operationally and economically practical solution to the need for safe and reliable equipment for handling the loading and unloading of even relatively heavy loads to be hauled in trucks, vans or the like as to which considerations of clearances, available space and cost render conventional hoisting equipment impractical.

A vehicle having a self-contained lifting system allows a single individual to pick-up and transport heavier than usual objects.

There has been provided a lift system for adaptation to a truck bed configured to lift heavy objects such as motorcycles. While the lift system has been described in the context of specific embodiments thereof, other unforeseen alternatives, modifications, and variations may become apparent to those skilled in the art having read the foregoing description. Accordingly, it is intended to embrace those alternatives, modifications, and variations, which fall within the broad scope of the appended claims.

What is claimed is:

1. A lift system comprising:
a chassis having a frame, said chassis configured to be placed in a bed of a pick-up truck;
said frame including a first extension member and a second extension member opposite thereof, each of said first extension member and said second extension member being extendable and coupled to said frame;
a first scissor support being coupled to said first extension member;
a second scissor support being coupled to said second extension member;
said first and second scissor supports configured rigid and extendable from each of said first and second extension members;
a platform coupled to each of said first and second scissor support;
said platform configured to rigidly support an object coupled thereto;
an extender coupled to said platform at a central portion of said platform, said extender being configured to translate along said platform and extend a length of said platform; and
an actuator coupled to said scissor lift, said actuator configured to move said platform, wherein said actuator is configured to extend and retract said first extension member and said second extension member, wherein said actuator is coupled to a center axis of each of said first and second scissor supports.

2. The lift system of claim 1, wherein said chassis is insertable in said bed.

3. The lift system of claim 2, wherein said chassis is removable from said bed.

4. The lift system of claim 1, wherein said frame comprises at least one cross member coupling said first extension member and said second extension member.

5. The lift system of claim 1, wherein said first extension member and said second extension member are configured as a nested arrangement configured to telescopically translate relative to each other beyond a cargo area.

6. The lift system of claim 1, wherein said platform is configured to support a motorcycle.

7. The lift system of claim 1 wherein said platform comprises a wheel hitch configured to secure a wheel of a motorcycle.

8. The lift system of claim 1, wherein said first and second scissor supports are configured hinged at a center axis, configured to raise and lower said platform.

9. The lift system of claim 1, wherein said first and second scissor supports are configured rigid and configured to prevent said platform from at least one of twisting and swinging relative to said first extension member and said second extension member.

10. The lift system of claim 1 wherein said first extension member and said second extension member each further comprise:
a bottom section formed in a C-channel cross-section coupled to said chassis;
a center section nested in said bottom section;
an upper section coupled to said center section opposite said bottom section and configured to cover a nested arrangement.

11. The lift system of claim 10 wherein said center section comprises a I-beam shaped cross-section.

12. The lift system of claim 10, wherein said upper section comprises a translational slide configured to guide said first and second scissor supports respectively.

13. The lift system of claim 1 wherein said first and second scissor supports are coupled to said first extension member and said second extension member respectively at a pivot point, said pivot point being fixed to said first extension member and said second extension member respectively, and at a translational slide on said first extension member and said second extension member respectively, wherein said first and second scissor supports translate and pivot in said translational slide.

14. The lift system of claim 1 wherein said actuator further comprises a drive chain coupled to said actuator at a first end of said drive chain and coupled to a center axis of each of said first and second scissor supports at a second end of said drive chain.

15. The lift system of claim 1 wherein said actuator further comprises a drive chain coupled to said actuator at a first end of said drive chain and coupled to a distal end of each of said first and second scissor supports at a second end of said drive chain.

16. A lift system comprising:
a chassis having a frame;
said frame including a first extension member and a second extension member opposite thereof, each of said first extension member and said second extension member being extendable and coupled to said frame;
a first scissor support being coupled to said first extension member;
a second scissor support being coupled to said second extension member;
said first and second scissor supports configured rigid and extendable from each of said first and second extension members;
a platform coupled to each of said first and second scissor support, wherein said platform comprises a wheel hitch configured to secure a wheel of a motorcycle;
said platform configured to rigidly support an object coupled thereto;
an extender coupled to said platform at a central portion of said platform, said extender being configured to translate along said platform and extend a length of the platform; and
an actuator coupled to said scissor lift, said actuator configured to move said platform, wherein said actuator is configured to extend and retract said first extension member and said second extension member, wherein said actuator is coupled to a center axis of each of said first and second scissor supports.

* * * * *